A. REAM & C. L. BUSH.

Improvement in Horse Hay Forks.

No. 125,330. Patented April 2, 1872.

Witnesses.
Jas. O. Hutchinson
C. L. Evert

Inventor.
Andrew Ream
Charles L. Bush
per
Alexander Mason
Attys.

AM. PHOTO-LITHOGRAPHIC CO. N.Y. (OSBORNE'S PROCESS.)

125,330

UNITED STATES PATENT OFFICE.

ANDREW REAM AND CHARLES L. BUSH, OF READING, PENNSYLVANIA.

IMPROVEMENT IN HORSE HAY-FORKS.

Specification forming part of Letters Patent No. 125,330, dated April 2, 1872.

*To all whom it may concern:*

Be it known that we, ANDREW REAM and CHARLES L. BUSH, of Reading, in the county of Berks and in the State of Pennsylvania, have invented certain new and useful Improvements in Hay-Fork; and do hereby declare that the following is a full, clear, and exact description thereof, reference being had to the accompanying drawing and to the letters of reference marked thereon making a part of this specification.

The nature of our invention consists in the construction and arrangement of a horse hay-fork, as will be hereinafter fully set forth.

In order to enable others skilled in the art to which our invention appertains to make and use the same, we will now proceed to describe its construction and operation, referring to the annexed drawing, in which—

Figure 1:
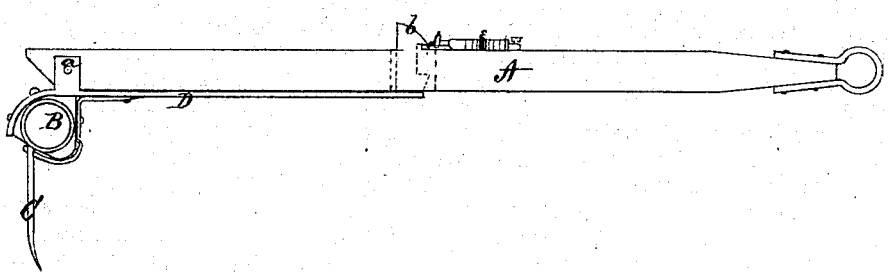
Figure 2:
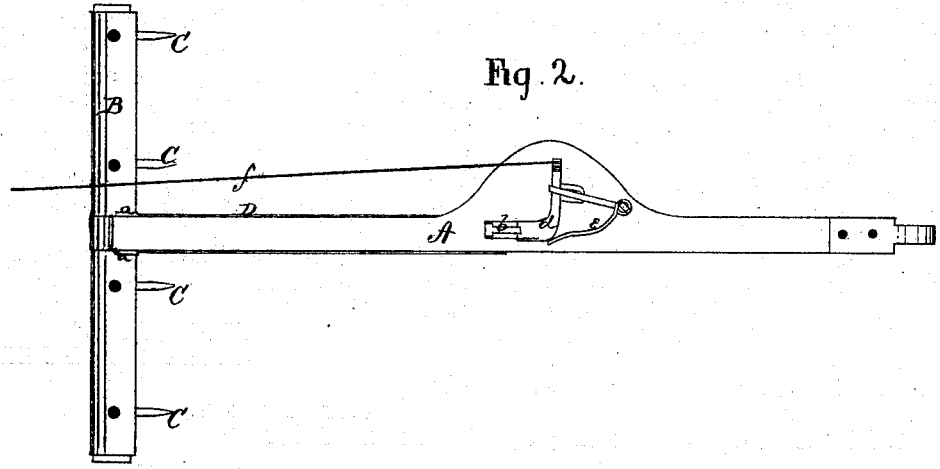

Figure 1 is a side view, and Fig 2 a plan view of our hay-fork.

A represents the beam of the rake, to the front end of which the team is to be hitched. B is the rake-head, provided with any desired number of suitably-shaped teeth, C C. This rake-head B is attached at its center to a bar, D, which is provided with two ears, $a\ a$, immediately above the rake-head. These ears project upward one on each side of the draft-beam A, near its rear end, and a bolt passing through the same pivots the bar D with the rake to said beam. The rear end of the beam A is beveled on its under side, as shown in Fig. 1. The bar D extends along the under side of the beam A for a suitable distance, and its front end is turned upward, forming a hook, $b$, which passes through a mortise in the beam. On the upper side of the beam is pivoted a latch, $d$, which, by means of a spring, $e$, is pressed into the hook $d$, and thus holds the rake in proper position at the rear end of the beam A. By pulling on the cord $f$ attached to the latch $d$, the hook $b$ is released and the rake tilted so as to deposit the hay. Then by merely backing the team the rake will latch itself again. It will be seen that by my construction of hay-fork the catching device as well as the operating-ropes are all on top of the beam and out of the way of the hay, so that when the fork is filled with hay the tripping device will not act unless from the hands of the operator by means of the rope above.

Having thus fully described our invention, what we claim as new, and desire to secure by Letters Patent, is—

The metallic bar D, rigidly connected with the rake-head, and provided with ears $a\ a$ near its rear end, and with an upward-extending hook-catch, $b$, at its front end, in combination with the beam A, having a slot for the hook to pass through, and a spring-latch, $d$, on its top, the said beam being pivoted in the ears of the plate D, all constructed to operate substantially as set forth.

In testimony that we claim the foregoing we have hereunto set our hands this 15th day of January, 1871.

ANDW. REAM.
    CHARLES L. BUSH.

Witnesses:
 MATTHIAS MENGEL,
 PETER REAM.